United States Patent
Kechichian et al.

(10) Patent No.: US 9,351,071 B2
(45) Date of Patent: May 24, 2016

(54) AUDIO SOURCE POSITION ESTIMATION

(71) Applicant: KONINKLIJKE PHILIPS N.V., Eindhoven (NL)

(72) Inventors: Patrick Kechichian, Eindhoven (NL); Okke Ouweltjes, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 103 days.

(21) Appl. No.: 14/372,073

(22) PCT Filed: Jan. 8, 2013

(86) PCT No.: PCT/IB2013/050139
§ 371 (c)(1),
(2) Date: Jul. 14, 2014

(87) PCT Pub. No.: WO2013/108147
PCT Pub. Date: Jul. 25, 2013

(65) Prior Publication Data
US 2014/0376741 A1    Dec. 25, 2014

Related U.S. Application Data

(60) Provisional application No. 61/587,267, filed on Jan. 17, 2012.

(51) Int. Cl.
| | | |
|---|---|---|
| *H04R 3/00* | (2006.01) | |
| *G01S 3/808* | (2006.01) | |
| *G10K 11/20* | (2006.01) | |
| *H04R 1/08* | (2006.01) | |
| *H04R 1/34* | (2006.01) | |
| *H04R 1/40* | (2006.01) | |

(52) U.S. Cl.
CPC ............ *H04R 3/005* (2013.01); *G01S 3/8083* (2013.01); *G10K 11/20* (2013.01); *H04R 1/08* (2013.01); *H04R 1/34* (2013.01); *H04R 1/406* (2013.01); *H04R 2430/20* (2013.01)

(58) Field of Classification Search
None
See application file for complete search history.

(56) References Cited

U.S. PATENT DOCUMENTS

| 4,862,278 A | 8/1989 | Dann |
| 5,969,838 A | 10/1999 | Paritsky |
| 8,315,418 B2 * | 11/2012 | Watanabe ............... H04R 1/406 381/26 |

(Continued)

FOREIGN PATENT DOCUMENTS

JP    2010213091 A    9/2010

*Primary Examiner* — Andrew L Sniezek
(74) *Attorney, Agent, or Firm* — Larry Liberchuk

(57) ABSTRACT

An apparatus for determining a position estimate for an audio source comprises two microphones (M1, M2) and an acoustic element (203) providing an acoustic effect to sound from sound source positions to the first microphone (M1). The acoustic effect is asymmetric with respect to an axis (201) between the microphones (M1, M2). A position circuit (305) estimates two possible positions on different sides of the axis for the sound source in response to time of arrivals at the microphones (M1, M2). An estimator (307) determines an acoustic effect measure being indicative of a degree to which an acoustic effect of the first microphone signal matches an expected characteristic of the acoustic effect for sound sources on one side of the axis (201). Another circuit (309) determines the position estimate by selecting between the two possible positions in response to the acoustic effect measure. The approach may resolve ambiguities in position determination associated with position determination based on time of arrival at two microphones.

14 Claims, 9 Drawing Sheets

(56) References Cited

U.S. PATENT DOCUMENTS

| | | |
|---|---|---|
| 2005/0265562 A1 | 12/2005 | Rui |
| 2006/0204023 A1 | 9/2006 | Stinson |
| 2006/0239471 A1 | 10/2006 | Mao |
| 2007/0160230 A1 | 7/2007 | Nakagomi |
| 2008/0084788 A1 | 4/2008 | Showen |
| 2009/0285409 A1* | 11/2009 | Yoshizawa ............ G01S 3/8083 381/92 |
| 2011/0110531 A1 | 5/2011 | Klefenz |
| 2012/0294118 A1* | 11/2012 | Haulick .............. G01S 7/52003 367/121 |

* cited by examiner

AUDIO SOURCE POSITION ESTIMATION

FIELD OF THE INVENTION

The invention relates to position determination for an audio source, and in particular, but not exclusively, to position estimation based on time difference of arrival for signals at two microphones.

BACKGROUND OF THE INVENTION

In many applications knowledge of the position of an audio source is beneficial and may e.g. be used to optimize the signal processing of audio captured from the audio source. For example, the signal processing for hands-free communication and teleconferencing applications may be optimized dependent on the specific position, and typically just the angular direction, of the sound source. Accordingly, many audio processing systems comprise audio tracking systems that allow the (e.g. angular) position of a sound source to be detected and tracked.

One approach for determining a position of an audio source uses a microphone array with the relative differences between the microphone signals being analyzed to estimate the position of the source. Common localization methods using microphone arrays are mainly based on calculating the time-difference of arrival of sound waves on each of the microphones.

Other localization methods using closely spaced microphones are based on constructing first order differential responses by combining two microphone signals and using an optimization criterion to steer a null in the direction of the sound source.

Using three microphones, the location of a sound source with respect to the array can be determined in the 360-degree (horizontal) azimuthal plane based on the time of arrivals, and indeed based on the differences in the time of arrival. However, in order to reduce the cost and complexity of the associated processing, it is desirable to reduce the number of microphones as much as possible, and it is therefore desirable to perform position determination using only two microphones.

With two microphones, a proper time of arrival calculation may allow determination of specific positions, i.e. position determination in typically the horizontal plane. However, such calculations require the time of transmission from the audio source to be known and thus typically require the audio source to be synchronized with the position determining circuitry. This is typically highly impractical and therefore position determination is typically based on the difference in time of arrival measurements between the microphones. For a two microphone implementation this means that only the angular direction can typically be determined with the distance to the sound source not being known. However, for many applications such an angular position determination is highly advantageous and indeed is sufficient for many applications.

However, another problem with a two microphone setup is that it is completely symmetric around the axis interconnecting the two microphones as illustrated in FIG. 1. In the example, two microphones M1 and M2 are used to determine the angular direction A to a sound source S based on a time of difference between the two microphones M1 and M2.

Thus, the system determines the time difference of arrival between the wave-fronts for the microphones M1 and M2. If the source is located in the far-field, then the sound waves can be assumed to be planar and parallel to each other. Using trigonometry, the angle is related to the Time Difference Of Arrival (TDOA) t (in seconds) by $$t = \frac{d}{c}\cos(A) \qquad (1)$$

where d is the inter-microphone spacing, and c is the speed of sound in air. The angle A can therefore be determined by $$A = \cos^{-1}\left(\frac{tc}{d}\right), \qquad (2)$$

where A is in the range [0,180°].

However, this approach has an inherent ambiguity and can only determine A in the range [0,180°]. Thus, it does not provide sufficient information about the direction of the source in the 360-degree azimuthal plane. Specifically, it cannot differentiate between whether the sound source is located at position S or at the phantom position G.

Hence, an improved approach for sound source position estimation would be advantageous and in particular an approach allowing increased flexibility, facilitated operation and/or implementation, lower complexity, reduced cost, reduced computational requirements and/or improved performance would be advantageous. In particular, an approach suitable for improved sound source position determination, and especially allowing ambiguity resolution, for a two microphone setup would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a position estimate for an audio source, the apparatus comprising: a first microphone for generating a first microphone signal; a second microphone for generating a second microphone signal; an acoustic element providing an acoustic effect to sound from sound source positions to the first microphone, the acoustic effect being asymmetric with respect to an axis between the first and the second microphone; a position processor comprising: a first position circuit for estimating a first possible position and a second possible position for a sound source in response to time of arrivals at the first microphone and the second microphone for audio from the sound source, the first possible position being a position in a first area on one side of the axis and the second possible position being a position in a second area on an opposite side of the axis; an estimator for determining a first acoustic effect measure for the first microphone signal, the first acoustic effect measure being indicative of a degree to which an acoustic effect of the first microphone signal matches an expected characteristic of the acoustic effect for sound sources in the first area; a second position circuit for determining the position estimate for the sound source by selecting between the first possible position and the second possible position in response to the first acoustic effect measure.

The invention may allow improved and/or facilitated position determination/estimation for a sound source. In particular, position determination/estimation may be performed using only two microphones.

The approach is based on a realization that a physical acoustic element can be used to break the symmetry between sound source positions and that an estimation of the asymmetric acoustic effect in the microphone signal can be used to resolve the ambiguity between different possible position estimates.

The expected characteristic of the acoustic effect may be a predetermined characteristic. The expected characteristic may reflect how the acoustic effect affects sound source positions for the first area. The acoustic effect will be different for acoustic effects in the first area and in the second area, and the expected characteristic can reflect this difference. The acoustic effect may be arranged to be much stronger for the first area relative to the second area, or vice versa. The expected characteristic may be an absence of an acoustic effect. For example, the acoustic effect may be significant for sound sources in the second area and negligible for sound sources in the first area and the expected characteristic for the first area may accordingly be that there is no (significant) acoustic effect.

The first position circuit may specifically be arranged to estimate the first possible position and the second possible position in response to a time difference of arrival between the first microphone and the second microphone for audio from the sound source.

The position may be a one dimensional position. For example, the first and second possible positions may be determined under a constraint limiting them to one dimensional positions. The positions may specifically be directions towards the sound source from the microphone arrangement, such as an angular direction.

The first and second areas may correspond to two-half planes of a position plane in which the first position circuit determines the two possible positions. The two half-planes are in such a case divided by the axis between the microphones. The position plane may specifically be a horizontal plane. The position plane may include the axis between the microphones.

The selection may be based on a comparison to a threshold. As a specific example, if the acoustic effect measure exceeds a threshold, the first possible position may be selected and otherwise the second possible position is selected.

In accordance with an optional feature of the invention, the first acoustic effect measure is indicative of the degree to which the acoustic effect of the first microphone signal matches the expected acoustic effect of the acoustic element for sound sources in the first area relative to a degree to which the acoustic effect of the first microphone signal matches an expected characteristic of the acoustic effect for sound sources in the second area.

This may provide improved position determination in many scenarios and may in particular provide a more reliable selection between the first and second possible positions. The expected acoustic effect for either the first or second area may be a null-effect, i.e. it may be expected that the acoustic effect is negligible for either the first or the second area.

In accordance with an optional feature of the invention, the acoustic effect is asymmetrically frequency dependent with respect to the axis, and the estimator is arranged to generate the first acoustic effect measure in response to a determination of a degree of correlation between a frequency response of the first signal and an expected frequency response for a sound source in the first area.

This may facilitate the processing and/or may provide a more reliable selection and/or may facilitate implementation of the acoustic element. The acoustic effect may exhibit a frequency transfer function from audio sources to the first microphone which is different for the two areas. The expected characteristic may specifically be an expected frequency domain characteristic for the first microphone signal.

In some embodiments, the estimator may be arranged to generate the first acoustic effect measure in response to a determination of a degree of correlation between a frequency response of the first signal and an expected frequency response for a sound source in the second area.

In accordance with an optional feature of the invention, the acoustic effect is asymmetrically frequency dependent; and the estimator comprises a filter for filtering the first microphone signal to generate a first filtered microphone signal, and is arranged to determine the first acoustic effect measure in response to the first filtered microphone signal.

This may provide a more reliable selection between the two possible positions in many embodiments. In many scenarios the acoustic element may provide an acoustic effect which is more pronounced and/or more asymmetric in a specific frequency interval, and by explicitly considering characteristics in such frequency intervals a more reliable selection can be achieved.

In accordance with an optional feature of the invention, the acoustic element is arranged to cause the first microphone to receive reflections from sound sources in the first area but not from sound sources in the second area.

This may provide a particularly significant and asymmetric effect which may provide a more reliable selection between the two possible positions in many scenarios. In particular, it may in many embodiments provide significant notches due to destructive interference between the direct and indirect paths. Such notches may be particularly reliably detected in a microphone signal, and may especially often be detectable even if the frequency response of the sound source signal is not known.

In accordance with an optional feature of the invention, the expected characteristic is an interference effect resulting from interference between direct and reflected sound components from sound sources in the first area.

This may provide a particularly significant and asymmetric effect which may provide a more reliable selection between the two possible positions in many scenarios. Specifically, it may often be a characteristic which can relatively easily be detected in the first microphone signal.

In accordance with an optional feature of the invention, the expected characteristic is an interference frequency response.

This may provide a particularly reliable selection between the two possible positions in many scenarios. In particular, the degree of notches at specific frequencies may be used to detect whether the sound source is positioned in the first or in the second area.

In accordance with an optional feature of the invention, the acoustic element is present only on one side of the axis.

This may facilitate the processing and/or may provide a more reliable selection and/or may facilitate implementation of the acoustic element. In particular, it may in many embodiments provide a low complexity approach for generating a highly asymmetric acoustic effect.

In accordance with an optional feature of the invention, the estimator is arranged to determine the first acoustic effect measure in response to a comparison of the first microphone signal to the second microphone signal.

This may provide improved position determination in many scenarios and may in particular provide a more reliable selection between the first and second possible positions. In many embodiments, it may provide an increased insensitivity to variations in the characteristics (e.g. the frequency distribution) of audio rendered from the audio source.

In accordance with an optional feature of the invention, the apparatus further comprises: a second acoustic element providing a second acoustic effect for sound from sound sources positions to the second microphone, the second acoustic effect being asymmetric with respect to the axis; and wherein the position processor comprises: a second estimator for determining a second acoustic effect measure for the second microphone signal, the second acoustic effect measure being indicative of a degree to which an acoustic effect of the second microphone signal matches an expected characteristic of the second acoustic effect for sound sources in the second area; and wherein the second position circuit is arranged to determine the position estimate for the sound source by further selecting between the first possible position and the second possible position in response to the second acoustic effect measure.

This may provide improved position determination in many scenarios and may in particular provide a more reliable selection between the first and second possible positions.

In accordance with an optional feature of the invention, the second position circuit is arranged to select the first possible position if the first acoustic effect measure exceeds the second acoustic effect measure and to select the second possible position if the second acoustic effect measure exceeds the first acoustic effect measure.

This may provide improved position determination in many scenarios and may in particular provide a more reliable selection between the first and second possible positions.

In accordance with an optional feature of the invention, a closest point of the acoustic element is positioned no more than 10 cm from the first microphone.

This may provide improved position determination in many scenarios and/or may provide a more practical implementation. In particular, it may insure that near-field effects can be ignored.

In accordance with an optional feature of the invention, a distance between the first microphone and the second microphone is no less than 1 cm and no more than 50 cm.

This may provide improved position determination in many scenarios and/or may provide a more practical implementation.

According to an aspect of the invention, there is provided an apparatus for determining from a first microphone signal from a first microphone and a second microphone signal from a second microphone a position estimate for an audio source in an audio environment comprising an acoustic element providing an acoustic effect to sound from sound source positions to the first microphone, the acoustic effect being asymmetric with respect to an axis between the first microphone and the second microphone; the apparatus comprising: a first receiver for receiving the first microphone signal; a second receiver for receiving the second microphone signal; a first position circuit for estimating a first possible position and a second possible position for a sound source in response to time of arrivals at the first microphone and the second microphone for audio from the sound source, the first possible position being a position in a first area on one side of the axis and the second possible position being a position in a second area on an opposite side of the axis; an estimator for determining an acoustic effect measure for the first microphone signal, the acoustic effect measure being indicative of a degree to which an acoustic effect of the first microphone signal matches an expected characteristic of the acoustic effect for sound sources in the first area; a second position circuit for determining a position estimate for the sound source by selecting between the first possible position and the second possible position in response to the acoustic effect measure.

According to an aspect of the invention, there is provided a method for determining from a first microphone signal from a first microphone and a second microphone signal from a second microphone a position estimate for an audio source in an audio environment comprising an acoustic element providing an acoustic effect to sound from sound source positions to the first microphone, the acoustic effect being asymmetric with respect to an axis between the first microphone and the second microphone; the method comprising: receiving the first microphone signal; receiving the second microphone signal; estimating a first possible position and a second possible position for a sound source in response to time of arrivals at the first microphone and the second microphone for audio from the sound source, the first possible position being a position in a first area on one side of the axis and the second possible position being a position in a second area on an opposite side of the axis; determining an acoustic effect measure for the first microphone signal, the acoustic effect measure being indicative of a degree to which an acoustic effect of the first microphone signal matches an expected characteristic of the acoustic effect for sound sources in the first area; and determining the position estimate for the sound source by selecting between the first possible position and the second possible position in response to the first acoustic effect measure.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to position estimation from a sound source using Time Difference Of Arrival (TDOA) at only two microphones to determine an angular direction towards the audio source. However, it will be appreciated that the invention is not limited to this application but may be applied to many other applications determining positions of sound sources.

Figure 1:
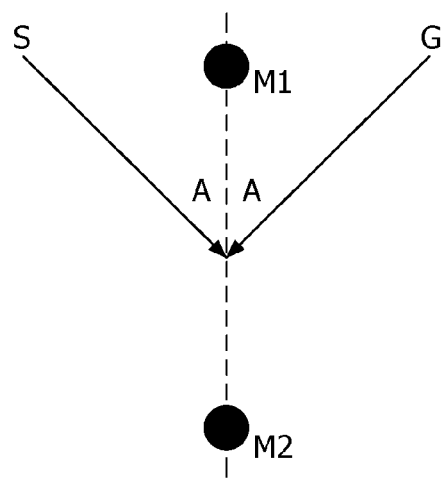
FIG. 1 is an illustration of an example of an arrangement for estimating the position of a sound source in accordance with prior art.
Figure 2:
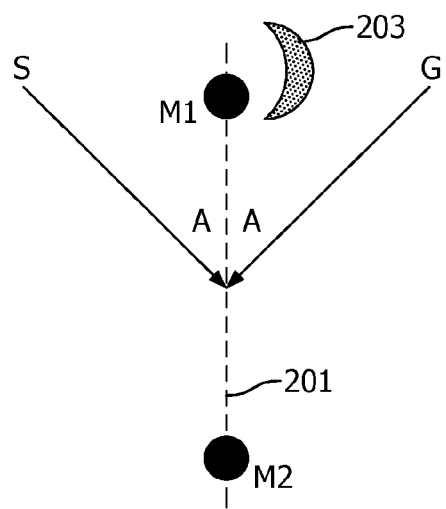
FIG. 2 is an illustration of an example of an arrangement for estimating the position of a sound source in accordance with some embodiments of the invention.

FIG. 2 illustrates an example of the configuration of the setup for the approach. Similarly to FIG. 1, the system employs two microphones M1 and M2 which are located with a given distance to each other. In the described approaches, a time difference of arrival of the sound from a sound source S to the two microphones M1 and M2 is used to first generate two possible positions. In particular, a first possible position in the half-plane to the left of the axis 201 between the microphones M1, M2 is generated and a second possible position in the half-plane to the right is generated. As the TDOA will be the same for symmetric positions around the axis 201 between the microphones M1, M2 (corresponding to the angular position estimate A of the TDOA algorithm only being able to determine positions in an 180° range), the TDOA algorithm will not be able to differentiate between the symmetric positions.

However, in the approach of FIG. 2, an acoustic element 203 is introduced which provides an acoustic effect to the sound from the sound source S to the first microphone M1. Furthermore, the acoustic effect is asymmetric with respect to the axis 201 between the microphones. The acoustic element 203 thus introduces a difference to the signal from the first microphone signal dependent on whether the sound source is in the left half plane or in the right half plane.

In the approach, this introduced asymmetry is used to select between the two possible positions (and specifically in the example between the two possible directions), i.e. to determine whether the sound source is at position S or G of FIG. 2. This is done by exploiting the fact that the acoustic effect of the acoustic element 203 on the first microphone signal is predictable and that the microphone signal from the first microphone M1 will accordingly exhibit a property corresponding to the physical effect for the left half plane if the sound source is located in the left half plane and a property corresponding to the physical effect for the right half plane if the sound source is located in the right half plane. Therefore, by detecting whether the measured microphone signal exhibits a property that most closely correspond to that of the left half plane or the right half plane, it is possible to determine whether the position of the sound source is in the left half plane or in the right half plane, and accordingly to select the appropriate position from the two possible positions.

More specifically, in the example of FIG. 2, an acoustic element 203 (specifically an obstruction) is located near the first microphone M1 and is designed in such a way that the acoustic effect for (and thus the impact on the signal from) the first microphone M1 depends on whether the acoustic element 203 is located between the sound source and the microphone M1 or whether the microphone M1 is located between the sound source and the acoustic element 203. In particular, the acoustic element 203 may be such that a strong and clearly detectable acoustic effect occurs for one scenario but not for the other. The selection between the two possible position estimates may then be done simply on the basis of whether the acoustic effect can be detected in the first microphone signal or not.

Figure 3:
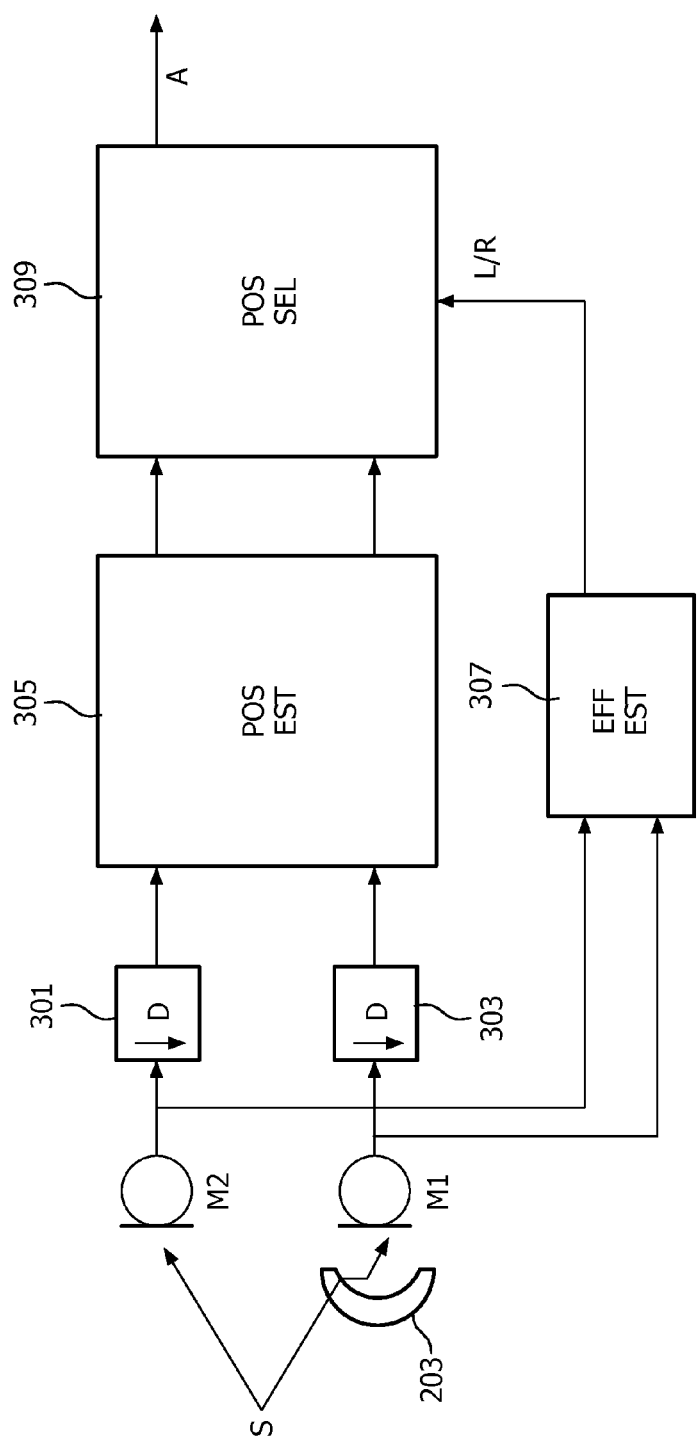
FIG. 3 illustrates an example of elements of a system for determining a position estimate for an audio source in accordance with some embodiments of the invention.

FIG. 3 illustrates an example of a system for determining a position estimate for an audio source in accordance with some embodiments of the invention.

The system includes the arrangement illustrated in FIG. 2. Thus, the system comprises a first and second microphone M1, M2 with an acoustic element 203 proximal to the first microphone M1. The acoustic element 203 is closer to the first microphone M1 than to the second microphone M2 and the impact on the acoustic signal at the second microphone M2 may be negligible. Furthermore, the acoustic effect provided to the first microphone M1 is asymmetric with respect to the axis 201 between the microphones M1, M2.

In the example of FIG. 3, the first and second microphones M1, M2 provide digitized and suitably amplified microphone signals (or equivalently the first and second microphones M1, M2 are fed to circuits (not shown) for suitably amplifying and digitizing the captured analog microphone signals).

In the example, the digitized signals are fed to optional down-converters 301, 303 which reduce the sample rate to a suitable rate in order to reduce the computational load for the subsequent processing.

The down-converted microphone signals are then fed to a first position processor 305 which generates an estimate for a first possible position and a second possible position for the sound source in response to time of arrivals at the first microphone M1 and at the second microphone M2 for audio from the sound source.

In the specific example, the first position processor 305 performs a TDOA estimation of a one-dimensional position. Specifically, the angular direction A towards the sound source from a midpoint between the microphones M1, M2 is estimated based on the relative time difference between the two microphone signals.

It will appreciated that in other embodiments, a constraint may be used to determine a two dimensional position (or even a three dimensional position). For example, if it is known that the audio source is located at a fixed distance to the axis 201, the first position processor 305 may determine the corresponding two dimensional position based on the TDOA for the microphone signals (e.g. from the angular estimate and the distance to the axis 201).

Furthermore, although a TDOA algorithm based on two microphones typically allows only a one dimensional position to be determined, a two dimensional position estimation may be performed in other embodiments, for example by determining the absolute time of arrivals for the signals from the sound source. However, such an approach typically requires that the start time for the audio from the audio source is known which further requires the audio source and the system to be closely synchronized which is typically impractical.

Thus, in the example, the first position processor 305 determines two possible position estimates for the audio source. The two position estimates are symmetric around the axis between the microphones M1, M2.

It will be appreciated that many different algorithms and techniques for generating a position estimation based on a TDOA for signals at two microphones are known and that any suitable approach may be used. Due to the symmetry around the microphone axis, such algorithms will typically generate position estimates in a 180° angular range, and thus will provide one position estimate (e.g. one direction) in each of the half-planes of the axis.

Thus, the first position processor 305 will generate a first possible position estimate which lies in an first area which is to one side of the microphone axis 201 and a second possible position estimate which lies in a second area that is on the opposite side of the microphone axis 201. Although each area in principle may correspond to a half plane delineated by the axis, the areas in which the system provides accurate position estimates may in many practical applications be more restricted. For example, for accurate position estimation, it may typically be required that the sound source is located in the far field, that the sound source is not too close to the microphone axis 201, that the sound source is not too far from the microphones, that the sound source is not too close to the acoustic element etc. Accordingly, in practice the areas in which the approach is considered to be practically applicable may be substantially smaller than the entire half-plane.

Similarly, the approach performs position estimation in a two-dimensional plane and it is assumed that the sound sources lie substantially in this plane. For sound sources that are not located in the plane, the TDOA algorithm may provide estimates that deviate from the projected point in the two dimensional plane (essentially the TDOA algorithm generates position estimates that are rotationally symmetric around the microphone axis). Also, the effect of the acoustic element 203 may depending on the specific characteristics of the acoustic element 203 deviate from the expected value for sound sources outside the assumed plane. Thus, in practice, the accuracy and/or reliability of the position estimation may degrade for sound sources outside the plane in which they are assumed to be located. However, typically the approach will still be suitable for sound sources that do not deviate too significantly from the plane in which they are assumed to be positioned.

The first position processor 305 may specifically determine the TDOA based on a correlation estimation of the two microphone signals. For example, the cross-correlation function between the two microphones M1, M2 is taken with respect to time, and the time-lag τ that maximizes this function determines t. The time-lag bounds are based on the inter-microphone spacing $$-\frac{d}{c} \leq \tau \leq \frac{d}{c}. \qquad (3)$$

here d is the inter-microphone spacing, and c is the speed of sound in air.

Mathematically, the problem is $$t = \arg\max_{\tau} f(m_1(n), m_2(n-\tau)) \qquad (4)$$

where $m_1$ and $m_2$ are the first and second microphone signals, respectively, n indicates the time in seconds, and f represents the cross-correlation function.

On a digital processor, the signal is usually sampled at twice the Nyquist frequency of the signal, and so the correlation function produces a time-difference in samples which can be converted to seconds based on the sampling frequency. In the example where the signals are down-sampled, the down-sampled sample rate is appropriate and thus the down-sampling may introduce a lower granularity for the TDOA estimate and thus for the determined position.

As previously mentioned, the angular direction estimate can then be determined from:

$$A = \cos^{-1}\left(\frac{tc}{d}\right), \qquad (5)$$

where A is in the range [0,180°]. Thus, the two possible position estimates corresponding to the two angles ±A are generated by the first position processor 305.

As another example, the position estimator 305 may in some embodiments perform the position estimation by applying a beamforming algorithm to the microphone signals where the beamforming algorithm is arranged to weight and combine the signals to provide a null in the direction of the sound source. Thus, the beamforming may be an adaptive beamforming arranged to minimize the signal energy of the combination of the two microphones M1, M2. By combining the two microphone signals and applying adaptive signal processing to create a microphone response with a null in the direction of the source, a position estimate for the sound source is automatically generated.

Inherently such an approach seeks to combine the signals such that the difference in the path lengths from the audio source, and thus the differences in the time of arrival of the signals at the microphones M1, M2 result in a destructive interference between the signals, i.e. results in them being 180° out of phase. Thus, the approach is also inherently based on the time of arrival at the two microphones M1, M2 and specifically based on the time difference of arrival at the microphones M1, M2 Consequently the algorithm is also incapable of differentiating between the two half-planes and thus it estimates two possible positions.

In the system of FIG. 3, the two microphone signals are also fed to an acoustic effect estimator 307 which is arranged to determine an acoustic effect measure for the signal from the first microphone M1. The first acoustic effect measure is indicative of a degree to which an acoustic effect of the first microphone signal matches an expected characteristic of the acoustic effect of the acoustic element 203 for sound sources in one of the half-planes (or area thereof).

Specifically, the acoustic element 203 is a physical element with physical properties that provides an acoustic effect that is predictable. For example, the acoustic effect can be predetermined via a mathematical analysis, via specific measurements (e.g. during calibration of the system), via simulation and/or via evaluation of a model. Furthermore, the acoustic effect is designed to be asymmetric and therefore the estimated/predicted/predetermined acoustic effect of the acoustic element 203 will be different for sound sources in the two different half-planes.

By analyzing the received first microphone signal the acoustic effect estimator 307 accordingly can determine whether the first microphone signal has a property that is likely to result from an acoustic effect experienced for a sound source positioned in the first half-plane or for a sound source positioned in the second half-plane.

It will be appreciated that in many embodiments, the first microphone signal can simply be compared to the acoustic effect, and the acoustic effect measure may indicate how close the similarity is. For example, if the acoustic effect provides a notch in the acoustic transfer function from an audio source in the first half-plane, the acoustic effect estimator 307 may determine the acoustic effect measure to reflect the degree to which the first microphone signal has a notch at the expected frequency.

Such a direct comparison is typically appropriate when the particular characteristics of the sound rendered from the audio source can be ignored. For example, when the acoustic effect is a characteristic pattern of the frequency response of the transfer function in a given frequency interval, the captured first microphone signal can directly be evaluated to see if it has a similar pattern in the frequency interval, provided that the sound from the audio source can be considered to have a substantially flat frequency response in the given frequency interval. It will be appreciated that in some scenarios or embodiments, the determination of the acoustic effect measure may include a compensation of the first microphone signal for characteristics of the audio rendered from the audio source, e.g. using the audio from the audio source captured by the second microphone M2.

The first position processor 305 and the acoustic effect estimator 307 are coupled to a position selector 309 which receives the acoustic effect measure and the two possible positions. The position selector 309 is arranged to determine the final estimated position estimate for the sound source based on the acoustic effect measure. Thus, the position selector 309 selects between the two possible positions, i.e. between the position in the first half-plane and the position in the second half-plane based on the value of the acoustic effect measure.

For example, if the acoustic effect measure indicates that the first microphone signal has a characteristic which closely matches that of the acoustic effect from the first half plane, it proceeds to generate the final position estimate as the possible position estimate in the first half plane. Otherwise, it proceeds to generate the final position estimate as the possible position estimate in the second half plane. For example, the position selector 309 may simply select between the two possible positions depending on whether the acoustic effect measure exceeds a threshold or not.

Thus, the system uses the introduction of an acoustic element to provide a predictable acoustic effect that is asymmetric and which can be detected in at least one of the microphone signals in order to resolve the ambiguity introduced by a TDOA approach using only two microphones. Thus, an improved position determination can be achieved.

In some embodiments, the determination of the acoustic effect measure may be based only on an analysis of whether the microphone signal from the first microphone M1 matches the expected acoustic effect from the first half-plane. For example, if a given frequency domain pattern is expected for sound sources in the first half-plane, the acoustic effect estimator 307 may simply determine a frequency domain correlation value between the expected frequency response and the frequency response of the received signal (thus assuming that the sound source is sufficiently flat in the frequency interval considered).

However, in other embodiments, the acoustic effect measure may also be determined in response to the degree to which the first microphone signal matches the expected characteristic of the acoustic effect for sound sources in the other half-plane.

For example, if the acoustic effect is such that a given frequency domain pattern is expected from one half-plane and a different frequency domain pattern is expected from the other half-plane, the acoustic effect measure may determine a frequency correlation value for both frequency patterns. The acoustic effect measure may then for example be determined as the ratio between the correlation value for the first half plane divided by the correlation value for the second half plane. The position selector 309 may in such an example simply select the position estimate in the first half plane if the acoustic effect measure is above one, and otherwise select the position estimate in the second half plane. Thus, the position for which the first microphone signal most closely matches the expected frequency pattern is selected.

In many embodiments, the acoustic element 203 is designed such that the acoustic effect is asymmetrically frequency dependent with respect to the microphone axis 201. Specifically, the acoustic element 203 may be arranged to introduce a frequency dependent variation to the acoustic transfer function for audio sources in the first half plane but not in the second half plane. The acoustic effect measure may in such cases be determined by evaluating how closely the frequency representation of the received signal matches that introduced by the acoustic element for sound sources in the first half plane.

In some embodiments, such a correlation or comparison may involve a compensation for a frequency response of the sound radiated from the audio source. This may for example be done by compensating the first microphone signal based on the second microphone signal for which the acoustic element 203 typically has no effect. Accordingly, the second microphone signal should represent the frequency response of the radiated sound from the sound source (provided this is sufficiently louder than noise and other sound sources). Indeed, it may further reflect frequency characteristics of the audio environment.

For example, an FFT may be applied to both the first and second microphone signals. The values for the first microphone signal may then be divided by the corresponding values of the second microphone signal (typically after normalization). The resulting frequency spectrum may then be correlated with the expected frequency pattern for the acoustic effect to determine the acoustic effect measure. The position selector 309 can thus select between the two positions depending on whether the correlation is sufficiently high or not.

In many scenarios, the physical effect can be restricted to, or made most dominant in, a relatively narrow frequency interval. In such cases, the acoustic effect estimator 307 may advantageously include a filter which filters out a relevant frequency interval and the determination of the acoustic effect measure may be determined from the filtered signal. Such an approach may in many scenarios provide an improved and more reliable position determination.

The filtering may be performed implicitly. For example, an FFT may be applied to the first microphone signal but only a subset of the bin values may be compared to an expected frequency response.

Figure 4:
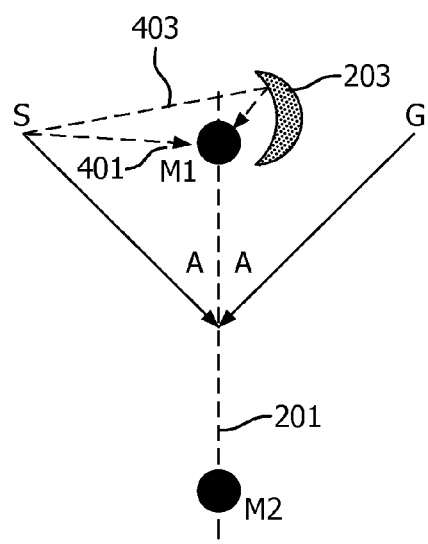
FIG. 4 is an illustration of an example of an arrangement for estimating the position of a sound source in accordance with some embodiments of the invention.

In some embodiments, the acoustic element 203 is arranged to cause the first microphone M1 to receive reflections from sound sources in the first area but not from sound sources in the second area. This is illustrated in FIG. 4 where the acoustic element 201 can reflect sound sources from the half plane which includes S. As illustrated, a direct acoustic path 401 exists from the sound source S to the microphone M1. In addition, a reflected acoustic path 403 exists from the sound source S to the microphone M1. However, any reflections from the sound source position G will be away from the microphone M1. Thus, the acoustic element 201 introduces reflections only to sound sources from one half-plane.

In these embodiments, the system may be arranged to detect a characteristic in the first microphone signal corresponding to such reflections. Specifically, the acoustic element 203 can be designed such that the reflections introduce an interference effect between the direct and the reflected path. Furthermore, by designing the acoustic element 203 appropriately (specifically the distance from the microphone M1 to the acoustic element's reflecting surface), the interference effect can be arranged to introduce a recognizable frequency pattern. Indeed, the design can ensure that the reflections occur in a desirable frequency range.

Specifically, the reflections can introduce interference that introduces one or more significant notches in the frequency response. This can be achieved by designing the acoustic element 203 to provide a destructive interference for a given frequency. Specifically, the destructive interference occurs when the difference between the direct and the reflected path lengths is equal to half a wavelength (resulting in the signals reaching the microphone being 180° out of phase).

Thus, as illustrated in FIG. 4, a difference in spectral characteristics can arise depending on which side of the microphone axis the source is located. For microphone M1, for example, an effect similar to that of the boundary effect is created, causing constructive and destructive interference between the direct and reflected sound for sound sources in the half-plane containing S. The frequencies at which these effects occur depend on the size, shape and distance of the obstruction with respect to microphone.

Thus, in some embodiments, the frequency response corresponding to the interference effects may be predetermined and the received first microphone signal may be compared to the predetermined frequency response. If a sufficiently close match is detected the position estimate in the opposite half plane to the acoustic element 203 is selected and otherwise the position estimate in the same half plane as the acoustic element 203 is selected.

In some embodiments, the expected characteristic may be that the first and second microphone signals should be substantially equal from sound sources in one half-plane but not for sound sources in the other plane. For example, in FIG. 4, the microphone signals will be substantially equal for sound sources in the half-plane containing G but different for sound sources in the half-plane containing C. Thus, the expected characteristic for the first microphone signal may be a relative characteristic, i.e. that it has a certain relationship with that of the second microphone signal (and as a low complexity example that the two signals should be the same or different depending on which half-plane the position is in).

Thus, in some embodiments, the acoustic effect measure is determined in response to a comparison of the first microphone signal to the second microphone signal.

As a specific example of an approach based on the interference characteristics from reflections, the acoustic effect estimator 307 can use band-pass filtering to only filter out regions of the signal spectrum that are affected by the acoustic element 201. The powers of the band-pass signals are then compared to determine which half-plane (left or right) the sound source is located in. The acoustic element 201 can be designed so as to produce a clear difference in the spectra depending in which azimuthal half-plane the sound source is located.

Figure 5:
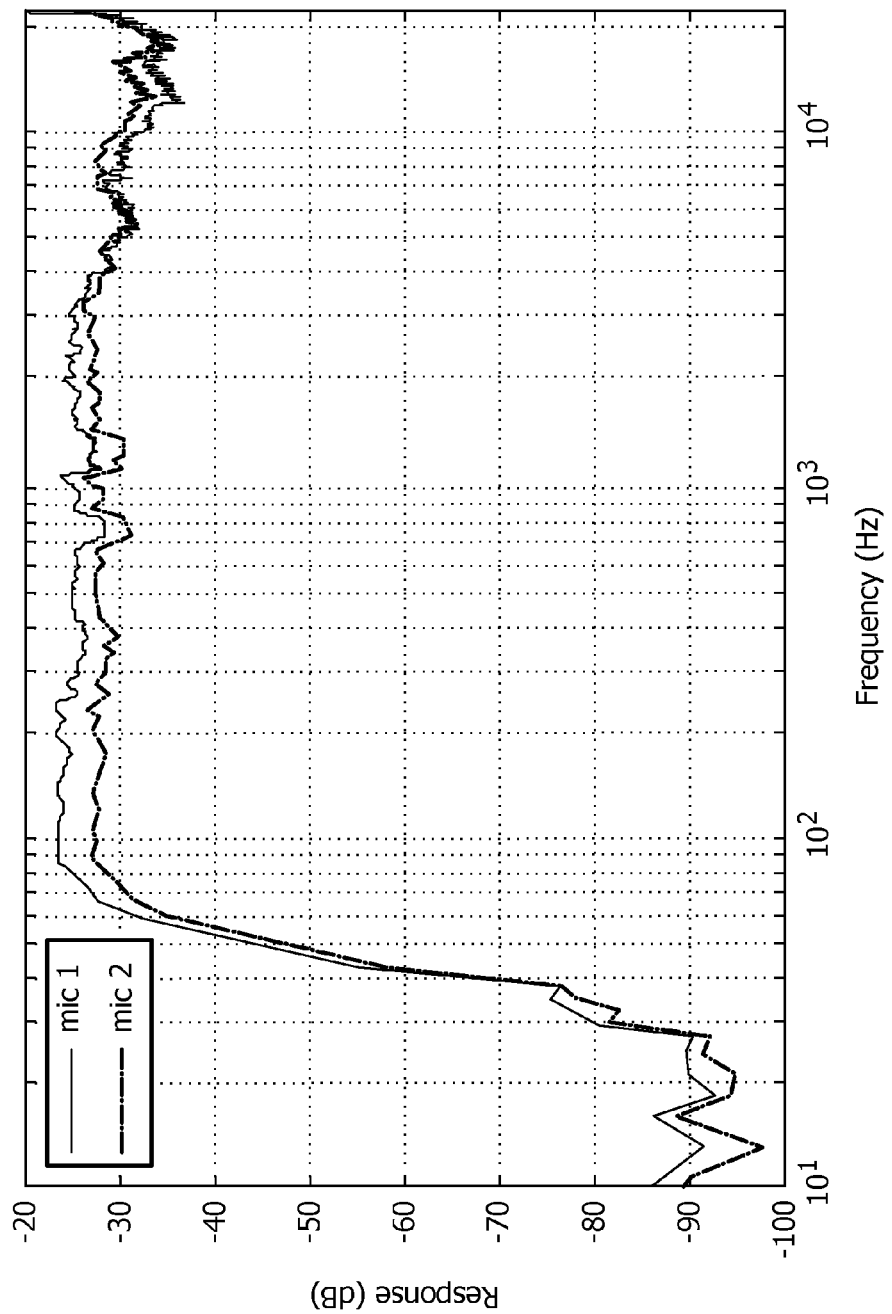
FIGS. 5-7 are illustrations of examples of frequency responses for arrangements for estimating the position of a sound source.
Figure 6:
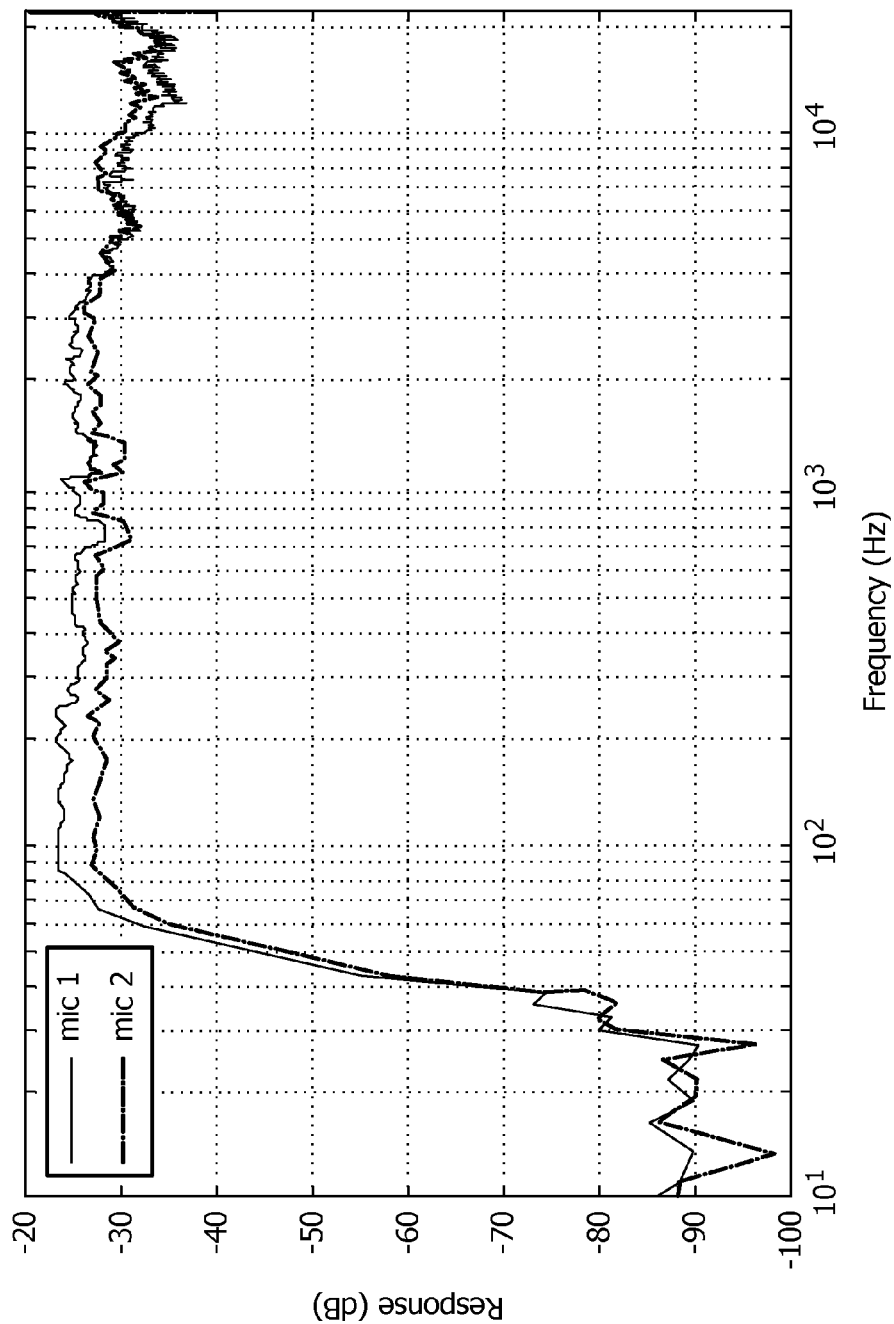
Figure 7:
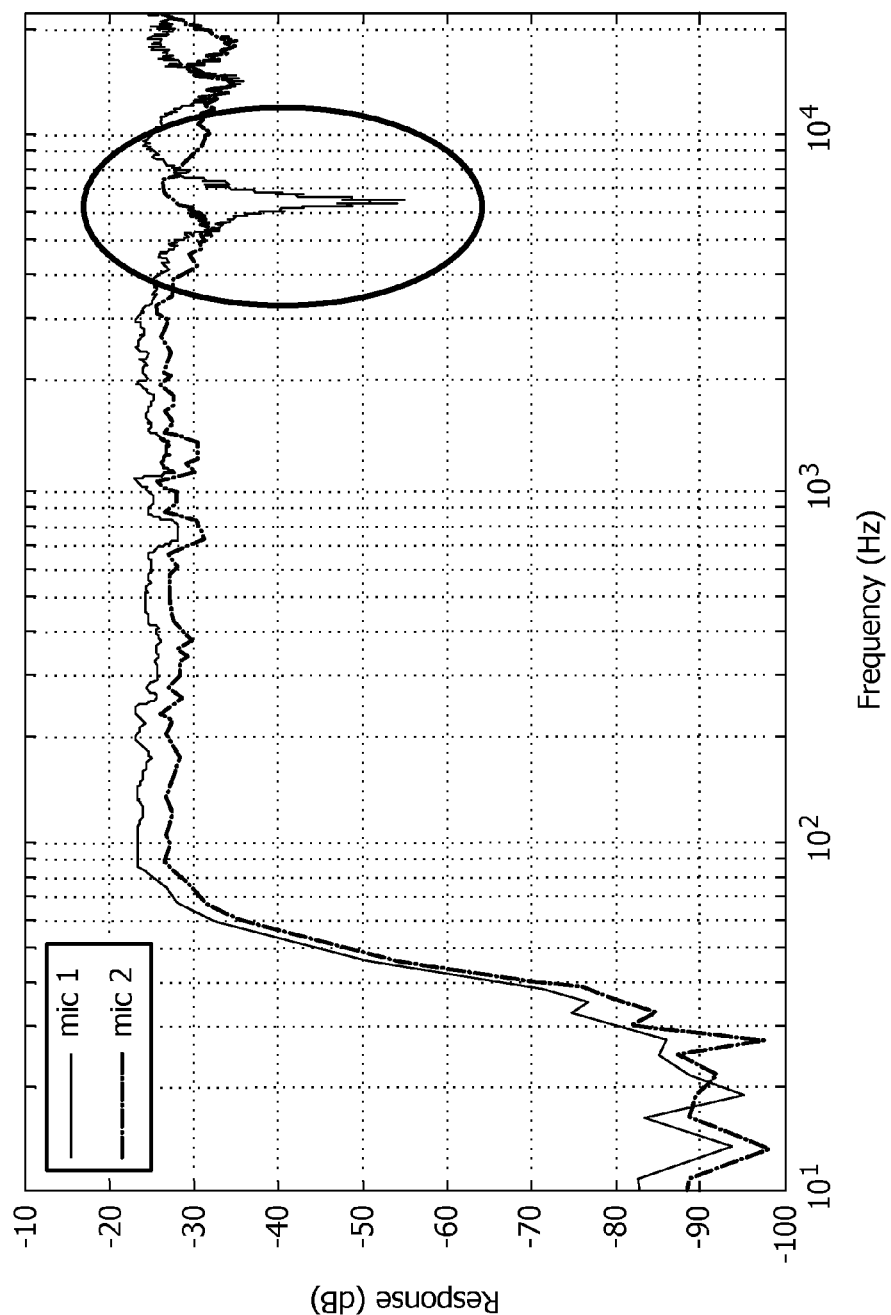

FIGS. 5-7 shows the spectral characteristics of a sweep signal played on a loudspeaker and captured by a 2-element microphone array located about 1.5 m away for three different configurations:

FIG. 5: No acoustic element 201 present.
FIG. 6: The acoustic element 201 is located between the first microphone M1 and the sound source.
FIG. 7: The acoustic element 201 is positioned opposite the sound sources (e.g. corresponding to FIG. 4 with the sound source at S).

FIG. 5 illustrates the difference in microphone spectra which is common within some given tolerances (usually +/−3 dB) from the manufacturing process.

Comparing FIGS. 6 and 7 shows a very clear and large difference between the microphone signal responses, depending on which half-plane the source is located. This difference reaches up to about 20 dB at around 6.5 kHz (there is also a modest boost of about 8 dB at around 10 kHz), and can be used for location discrimination purposes. Such differences are even larger than the +/−3 dB difference in microphone responses making the method robust against microphone mismatch.

Figure 8:
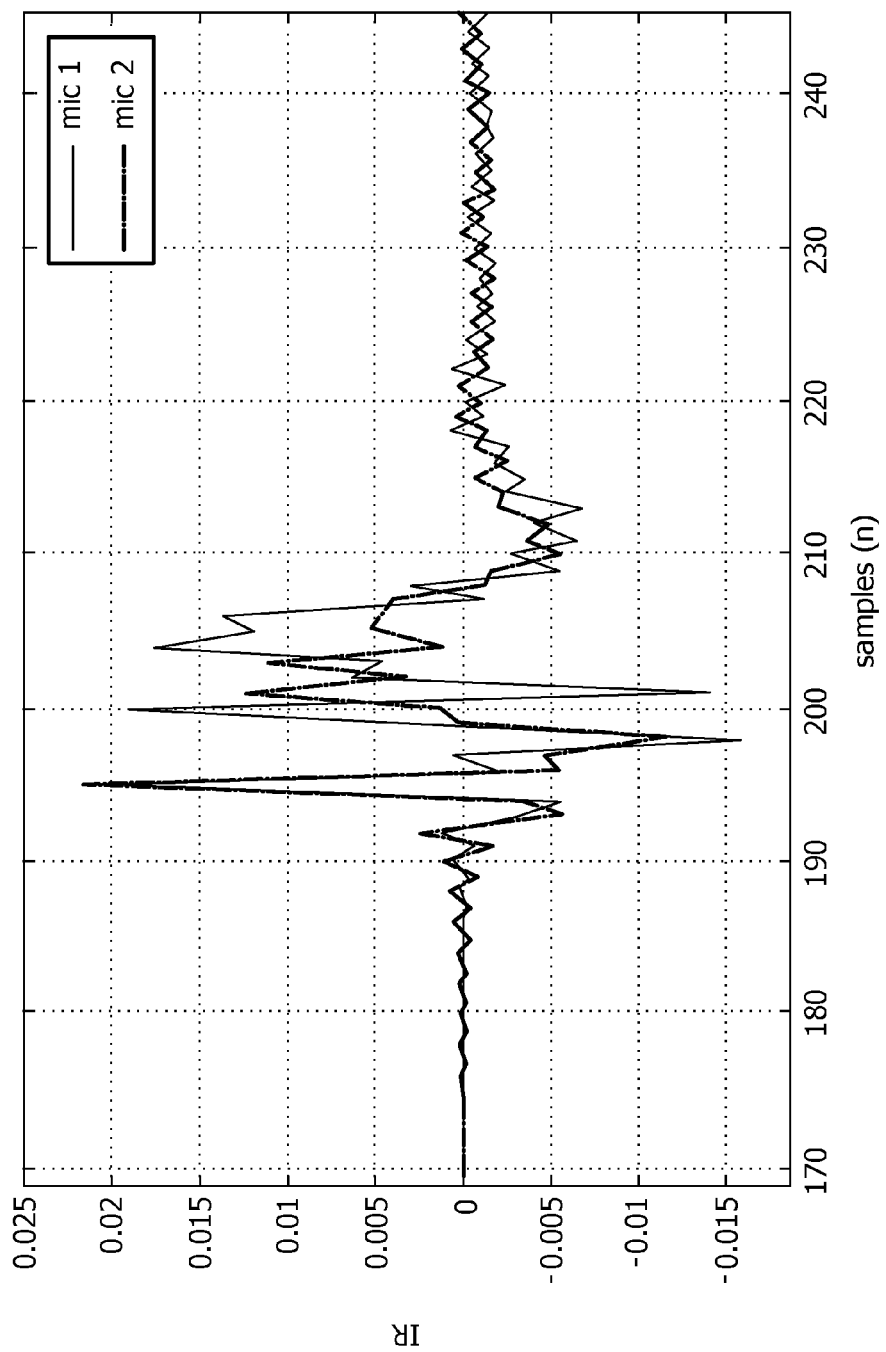
FIG. 8 is an illustration of examples of impulse responses for arrangements for estimating the position of a sound source.

To understand the mechanism behind the observed results at 6.5 kHz, the time-domain impulse responses shown in FIG. 8 may be considered. For the first microphone M1, the impulse response displays reflections at samples 198, 200, and 201 which are almost just as large in magnitude as the direct field associated with the sound waves that reach the microphone first. The reflections are clearly caused by the reflections produced by the first acoustic element and result in the destructive and constructive interference of the sound waves which yield the observations in FIG. 7. In contrast to FIG. 6 where the acoustic element 201 is located between the microphone and sound source, these reflections travel away from the microphone.

The physical and acoustic properties of the acoustic element generally depend on the preferences, requirements and restrictions of the individual embodiments. For example, for a reflection and interference based approach, the resulting spectral difference in the signals depends on the size, shape and distance of the acoustic element 203 with respect to microphone.

In the previous examples, the acoustic element 203 has been designed to be present on only one side of the axis 201, i.e. to be entirely within one half-plane. This may provide a low complexity approach while at the same time providing a high degree of asymmetry. In particular, the approach may restrict reflections on one microphone to only originate from one side of the microphone axis.

The arrangement of the microphones M1, M2 and the acoustic element 203 may often be quite compact yet provide good position estimation. Indeed, particularly advantageous performance has been found for arrangements where the distance between the first microphone M1 and the second microphone M2 is between 1 cm and 50 cm (both end points included). Furthermore, advantageous performance has been found for the acoustic element 203 being positioned close to the microphone M1. Specifically, it has been found that particularly advantageous performance has been found when the closest point of the acoustic element is positioned no more than 10 cm from the first microphone M1. A close acoustic element 203 may in particular provide strong reflections causing strong interference patterns in the audio frequency range.

Figure 9:
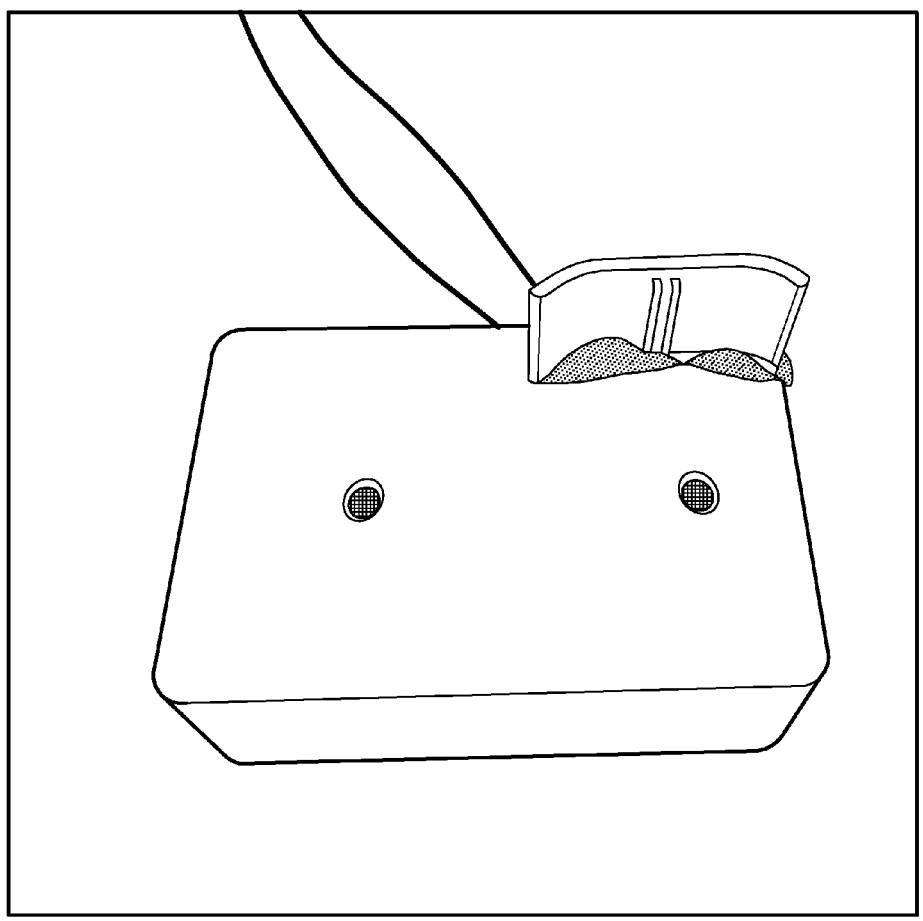
FIG. 9 illustrates an example of elements of a system for determining a position estimate for an audio source in accordance with some embodiments of the invention.

An example of an arrangement of microphones M1, M2 and an acoustic element 203 is illustrated in FIG. 9.

Figure 10:
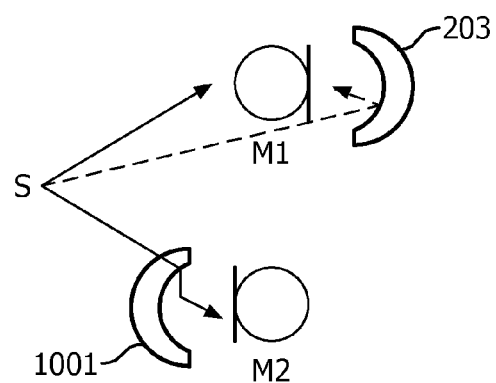
FIG. 10 is an illustration of an example of an arrangement for estimating the position of a sound source in accordance with some embodiments of the invention.

In some embodiments, the arrangement may include a second acoustic element 1001 positioned proximal to the second microphone M2 is illustrated in FIG. 10. The second acoustic element 1001 may be positioned symmetrically around the second microphone M2 with respect to the first acoustic element 203 around the first microphone M1.

In such an embodiment, a second estimator may be used for the second microphone M1 corresponding to the acoustic effect estimator 307. The selection between the two possible positions may in such embodiments be based on the estimation of how closely the first and second microphone signals are indicative of the acoustic effects from each of the two half-planes.

For example, in the example of FIG. 10, the audio from the sound source S will be reflected by the acoustic element 203 but not by the second acoustic element 1001. Thus, for this sound source, the first microphone signal will exhibit the characteristic frequency pattern of the interference effect caused by the reflections whereas the second microphone signal will not.

However, for an audio source at the symmetric position (with respect to the microphone axis), it will be the second microphone M2 which experiences reflections and thus interference, whereas the first microphone will not. Thus, in this case, the first microphone signal will not exhibit the characteristic frequency pattern of the interference effect caused by the reflections whereas the second microphone signal will.

The relative indications of the presence of a characteristic pattern for the interference effect may thus be used to select between the two possible scenarios. Specifically, correlations between the characteristic frequency pattern and the frequency domain representation of the two microphone signals respectively may be determined. The position corresponding to reflections occurring for the microphone exhibiting the highest correlation can then be selected.

The use of a second acoustic element may provide additional information useful for resolving the ambiguity and may thus increase the reliability of the selection, and thus of the generated final position estimate.

Figure 11:
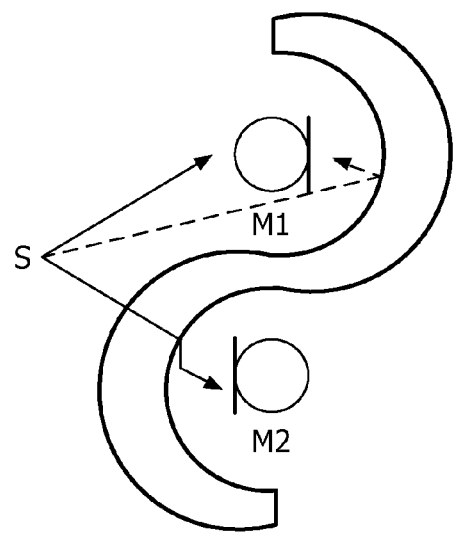
FIG. 11 is an illustration of an example of an arrangement for estimating the position of a sound source in accordance with some embodiments of the invention.

It will be appreciated that in some embodiments, the two acoustic elements 1001, 203 may be formed as parts of a single acoustic element. An example of such an embodiment is illustrated in FIG. 11.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed:

1. An apparatus for determining a position estimate for an audio source, the apparatus comprising:
a first microphone for generating a first microphone signal;
a second microphone for generating a second microphone signal;
an acoustic element providing an acoustic effect to sound from sound source positions to the first microphone, the acoustic effect being asymmetric with respect to an axis between the first and the second microphones;
a position processor comprising:
a first position circuit for estimating a first possible position and a second possible position for a sound source in response to time of arrivals at the first microphone and the second microphone for audio from the sound source, the first possible position being a position in a first area on one side of the axis and the second possible position being a position in a second area on an opposite side of the axis;
an estimator for determining a first acoustic effect measure for the first microphone signal, the first acoustic effect measure being indicative of a degree to which an acoustic effect of the first microphone signal matches an expected characteristic of the acoustic effect for sound sources in the first area;
a second position circuit for determining the position estimate for the sound source by selecting between the first possible position and the second possible position in response to the first acoustic effect measure.

2. The apparatus of claim 1, wherein the first acoustic effect measure is indicative of the degree to which the acoustic effect of the first microphone signal matches the expected acoustic effect of the acoustic element for sound sources in the first area relative to a degree to which the acoustic effect of the first microphone signal matches an expected characteristic of the acoustic effect for sound sources in the second area.

3. The apparatus of claim 1, wherein the acoustic effect is asymmetrically frequency dependent with respect to the axis, and the estimator is arranged to generate the first acoustic effect measure in response to a determination of a degree of correlation between a frequency response of the first signal and an expected frequency response for a sound source in the first area.

4. The apparatus of claim 1, wherein the acoustic effect is asymmetrically frequency dependent; and wherein the estimator comprises a filter for filtering the first microphone signal to generate a first filtered microphone signal, and is arranged to determine the first acoustic effect measure in response to the first filtered microphone signal.

5. The apparatus of claim 1, wherein the acoustic element is arranged to cause the first microphone to receive reflections from sound sources in the first area but not from sound sources in the second area.

6. The apparatus of claim 5, wherein the expected characteristic is an interference effect resulting from interference between direct and reflected sound components from sound sources in the first area.

7. The apparatus of claim 6, wherein the expected characteristic is an interference frequency response.

8. The apparatus of claim 1, wherein the acoustic element is present only on one side of the axis.

9. The apparatus of claim 1, wherein the estimator is arranged to determine the first acoustic effect measure in response to a comparison of the first microphone signal to the second microphone signal.

10. The apparatus of claim 1, further comprising:
a second acoustic element providing a second acoustic effect for sound from sound sources positions to the second microphone, the second acoustic effect being asymmetric with respect to the axis; and wherein the position processor comprises:
a second estimator for determining a second acoustic effect measure for the second microphone signal, the second acoustic effect measure being indicative of a degree to which an acoustic effect of the second microphone signal matches an expected characteristic of the second acoustic effect for sound sources in the second area; and wherein
the second position circuit is arranged to determine the position estimate for the sound source by further selecting between the first possible position and the second possible position in response to the second acoustic effect measure.

11. The apparatus of claim 10, wherein the second position circuit is arranged to select the first possible position if the first acoustic effect measure exceeds the second acoustic effect measure and to select the second possible position if the second acoustic effect measure exceeds the first acoustic effect measure.

12. The apparatus of claim 1 wherein a closest point of the acoustic element is positioned no more than 10 cm from the first microphone.

13. The apparatus of claim 1 wherein a distance between the first microphone and the second microphone is no less than 1 cm and no more than 50 cm.

14. A method for determining from a first microphone signal from a first microphone and a second microphone signal from a second microphone a position estimate for an audio source in an audio environment comprising an acoustic element providing an acoustic effect to sound from sound source positions to the first microphone (M1), the acoustic effect being asymmetric with respect to an axis between the first microphone (M1) and the second microphone (M2), the method comprising:
receiving the first microphone signal;
receiving the second microphone signal;
estimating a first possible position and a second possible position for a sound source in response to time of arrivals at the first microphone and the second microphone for audio from the sound source, the first possible position being a position in a first area on one side of the axis and the second possible position being a position in a second area on an opposite side of the axis;
determining an acoustic effect measure for the first microphone signal, the acoustic effect measure being indicative of a degree to which an acoustic effect of the first microphone signal matches an expected characteristic of the acoustic effect for sound sources in the first area; and
determining the position estimate for the sound source by selecting between the first possible position and the second possible position in response to the first acoustic effect measure.

* * * * *